United States Patent Office 3,798,244
Patented Mar. 19, 1974

3,798,244
PROCESS FOR THE PRODUCTION OF 1-NITRO-ANTHRAQUINONE SUBSTANTIALLY FREE FROM DINITROANTHRAQUINONE
Fred Mueller, Munchenstein, Basel-Land, and Rudolf Winkler, Reinach, Basel-Land, Switzerland, assignors to Sandoz Ltd., Basel, Switzerland
No Drawing. Filed Feb. 14, 1972, Ser. No. 226,326
Claims priority, application Switzerland, Feb. 16, 1971, 2,251/71
Int. Cl. C09b 1/00
U.S. Cl. 260—369
8 Claims

ABSTRACT OF THE DISCLOSURE

Disclosed is a process for the removal of dinitroanthraquinone impurities from a mixture containing 1-nitroanthraquinone and such impurities, the process comprising treating the mixture with an aqueous solution of an alkali metal or ammonium sulphite with heating, at least 0.5 part by weight of the sulphite being employed to each part by weight of the mixture.

---

The present invention concerns a process for the production of 1-nitroanthraquinone, substantially free from impurities of 1,5-, 1,8-, 1,6-, and 1,7-dinitroanthraquinones.

1-nitroanthraquinone is of importance as a starting material for 1-aminoanthraquinone from which is obtained bromamine acid, an important dyestuff intermediate. In its production by nitration of anthraquinone, undesirable by-products, mainly 1,5-, 1,8-, ($\alpha,\alpha'$-), 1,6- and 1,7-($\alpha,\beta'$-) dinitroanthraquinones, are formed. The present invention is concerned with the removal of dinitroanthraquinone impurities from 1-nitroanthraquinone.

Thus, the present invention provides a process for the production of 1-nitroanthraquinone, substantially free from 1,5-, 1,8-, 1,6-, or 1,7-dinitroanthraquinone impurities, comprising treating a mixture comprising 1-nitroanthraquinone and at least one of said dinitroanthraquinones with an aqueous solution of an alkali metal or ammonium sulphite with heating, at least 0.5 part by weight of said sulphite being employed to each part by weight of said mixture.

Whilst the amount of the dinitroanthraquinone removed increases with the amount of sulphite employed, it is preferred not to exceed an amount of 3 parts by weight of sulphite to each part by weight of the mixture. A preferred amount of sulphite is from 0.7 to 1.3 parts by weights.

As examples of alkali metal sulphites may be given lithium, potassium and sodium sulphite, sodium sulphite being preferred.

It is preferred to use an aqueous sulphite solution having a concentration of at least 3.5%, although solutions of higher concentration, e.g. above 6.0%, preferably 10 to 20 or higher, e.g. saturated solutions, may be used with advantage. To stabilize the sulphite solution, the process may be carried out in an alkaline medium, e.g. at a pH value between 7 and 12. A preferred temperature is from 90° C. to reflux temperature. The optimum reaction time varies with the amount and concentration of the sulphite employed and the amount of dinitroanthraquinone present in the mixture. It is generally, however, between 1 and 6 hours, preferably between 2 and 5 hours.

The 1-nitroanthraquinone is separated from the mother lye by one of the standard methods, e.g. filtration or centrifuging, and is washed as necessary.

It is to be appreciated that the present invention is concerned primarily with the removal of dinitroanthraquinone impurities from 1-nitroanthraquinone. Thus, it is not concerned with the removal, for example, of anthraquinone, which may be present in unnitrated form in the mixture. Any anthraquinone may, of course, be removed in known manner in a pre-treatment purification step prior to treatment with the sulphite solution or, alternatively, it may be removed in a subsequent step, for example after conversion of the 1-nitroanthraquinone to 1-aminoanthraquinone and thence to bromamine acid, from which acid the anthraquinone is easily separated.

The invention is illustrated by the following examples in which all parts are by weight and the temperatures are in degrees centigrade.

EXAMPLE 1

123 parts of crude 1-nitroanthraquinone (produced by nitration of 100 parts of anthraquinone, the normal technical route) are added to 600–700 parts of water and 120–125 parts of sodium sulphite with stirring. The stirring is continued for 30 minutes until a suspension is formed. The suspension is refluxed for 4–5 hours, then filtered and washed with hot water. The moist product contains 77 parts of 1-nitroanthraquinone, which is equivalent to 63% of the crude starting 1-nitroanthraquinone and is contaminated with about 10% anthraquinone.

The moist crude product is added to a solution of 56 parts of sodium sulphite in 1000 parts of water and stirred for 1 hour at 95°. The hot suspension is filtered, washed free of sulphite and dried. 70 parts of 1-aminoanthraquinone of 90% pure 1-aminoanthraquinone content are obtained. This anthraquinone-containing 1-aminothraquinone can be converted into anthraquinone-containing bromamine acid by sulphobromination in known manner, from which the anthraquinone can be easily separated by filtering the aqueous solution of the acid. The yield of anthraquinone-free bromamine acid is 80 parts. The nitrate titre of the product is 91% and it is therefore suitable, like bromamine acid produced by the classic route, for the synthesis of aminoanthraquinone dyes, for example 1-amino-4-phenylamino-anthraquinone-2-sulphonic acid, 1 - amino -4-(2',4',6'-trimethylphenylamino)anthraquinone - 2 - sulphonic acid, 1-amino-4-cyclohexyl-aminoanthraquinone-2-sulphonic acid or 1-amino-4-(3',5',5'-trimethylcyclohexylamino)-anthraquinone-2-sulphonic acid.

EXAMPLE 2

50 parts of a mixture of 87% 1-nitroanthraquinone, 9%, 1,5-, 1,6- and 1,7- and 4% 1,8-dinitroanthraquinone (unnitrated anthraquinone having been removed in a preliminary step) are added to 500 parts of water containing 35 parts of anhydrous sodium sulphite and 6.5 parts of 30% sodium hydroxide solution. The suspension is maintained at 90–95° for 1 hour, filtered while hot, and the filtercake washed with hot water until neutral.

The resulting product (43.1 parts) contains 97% 1-nitroanthraquinone, 2% 1,5- and 1% 1,8-dinitroanthraquinone. Thus, whilst 80% of the undesired dinitro isomers have been removed, only 4% of the desired 1-nitro compound has been lost.

EXAMPLE 3

A crude mixture containing 70% 1-nitroanthraquinone 3% anthraquinone, 3% 2-nitroanthraquinone and 24% dinitroanthraquinone is used as starting material.

A suspension of 50 parts of this starting material in 3500 parts of water and 135 parts of anhydrous sodium sulphite is stirred for 3 hours at 95° at pH 11–12, then filtered with suction, washed with hot water until neutral, and dried. 36 parts of a purified compound containing 7% of dinitro compound (mainly the 1,5- and 1,8-compounds) are obtained.

What is claimed is:

1. In a process wherein 1-nitroanthraquinone containing a dinitroanthraquinone impurity is treated at elevated temperatures with an aqueous solution of an alkali metal sulphite or ammonium sulphite to effect solubilization of said dinitroanthraquinone and the solubilized dinitroanthraquinone is removed from said 1-nitroanthraquinone, the improvement which comprises treating a mixture of 1-nitroanthraquinone and one or more compounds selected from the group consisting of 1,5-, 1,6-, 1,7-, and 1,8-dinitroanthraquinone with 0.5 to 3 parts by weight of the sulphite per part by weight of said mixture.

2. A process according to claim 1, wherein from 0.7 to 1.3 parts by weight of said sulphite are employed to each part by weight of said mixture.

3. A process according to claim 1, wherein the concentration of said aqueous sulphite solution is at least 3.5%.

4. A process according to claim 3, wherein the concentration of the aqueous sulphite solution is at least 6.0%.

5. A process according to claim 4, wherein the concentration of the aqueous sulphite solution is from 10 to 20%.

6. A process according to claim 3, wherein a saturated aqueous sulphite solution is employed.

7. A process according to claim 1, wherein a pH value of between 7 and 12 is maintained.

8. A process according to claim 1 wherein the treatment with said sulphite is carried out at a temperature of from 90° C. to reflux.

References Cited

UNITED STATES PATENTS

| 2,302,729 | 11/1942 | Whelen | 260—369 |
| 2,309,708 | 2/1943 | Olpin et al. | 260—369 |
| 1,540,467 | 6/1925 | Ferz | 260—369 |
| 2,293,782 | 8/1942 | Waldron et al. | 260—369 |

LORRAINE A. WEINBERGER, Primary Examiner

E. J. SKELLY, Assistant Examiner